Aug. 8, 1961   H. L. WEISS   2,995,670
ELECTRIC POWER DISTRIBUTION SYSTEM
Original Filed Aug. 3, 1954   4 Sheets-Sheet 1
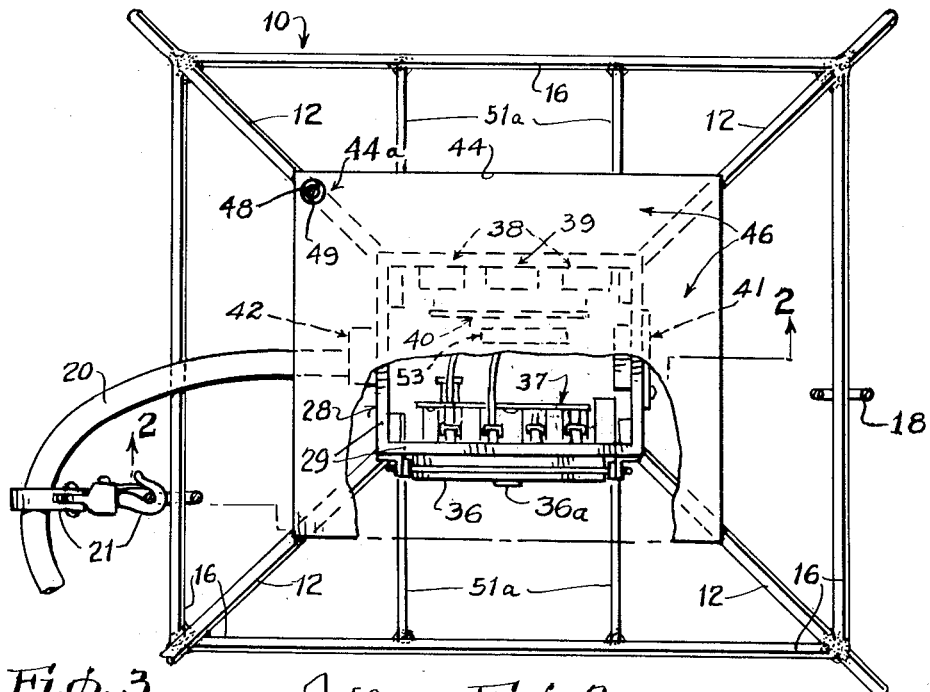
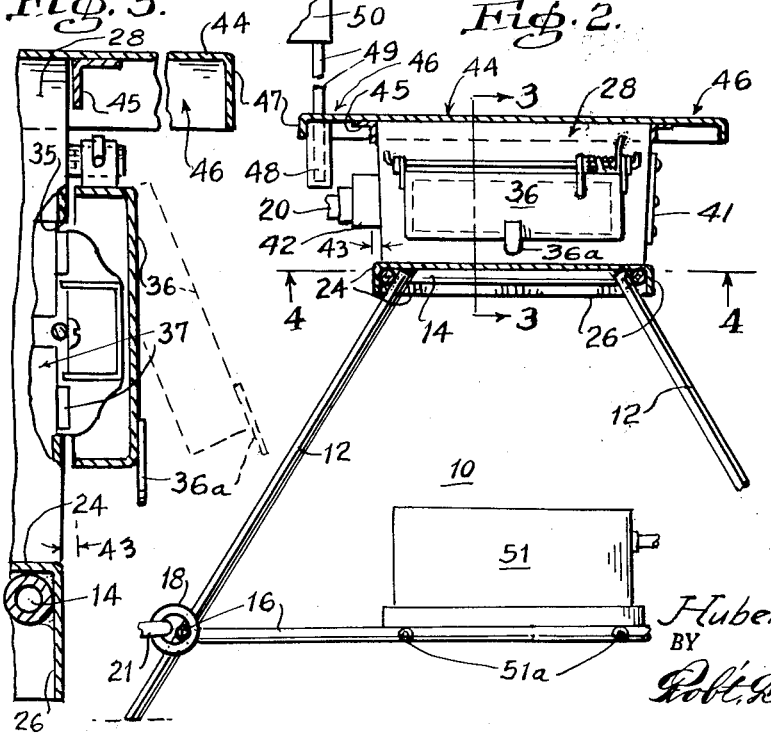
INVENTOR.
Hubert L. Weiss
BY
Robt. D. Pearson
ATTORNEY.

Aug. 8, 1961 H. L. WEISS 2,995,670
ELECTRIC POWER DISTRIBUTION SYSTEM
Original Filed Aug. 3, 1954 4 Sheets-Sheet 2
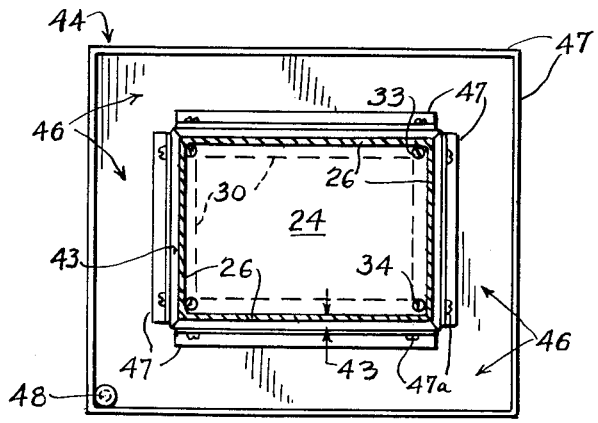
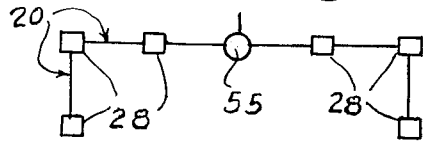
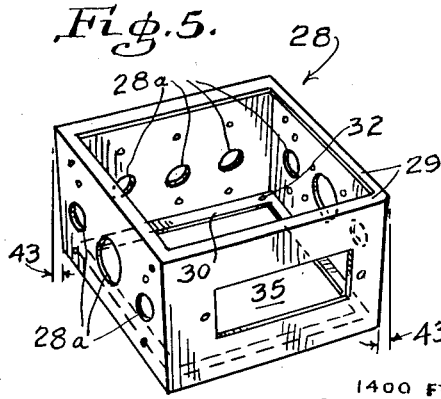
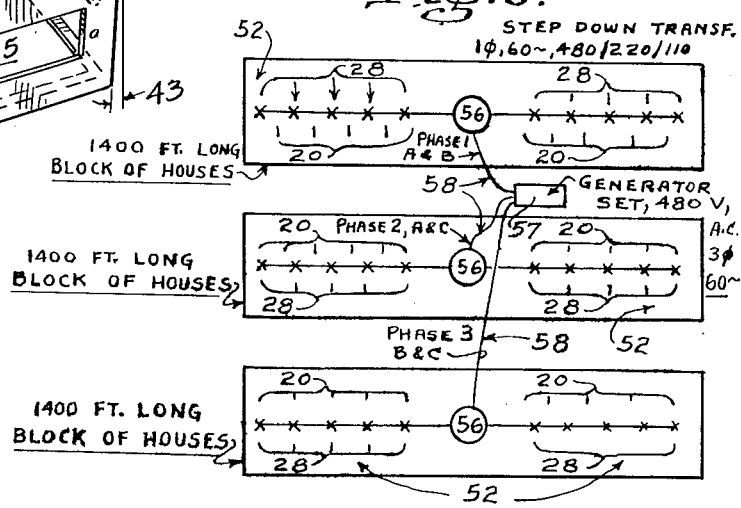
INVENTOR.
Hubert L. Weiss
BY
Robt. D. Pearson
ATTORNEY.

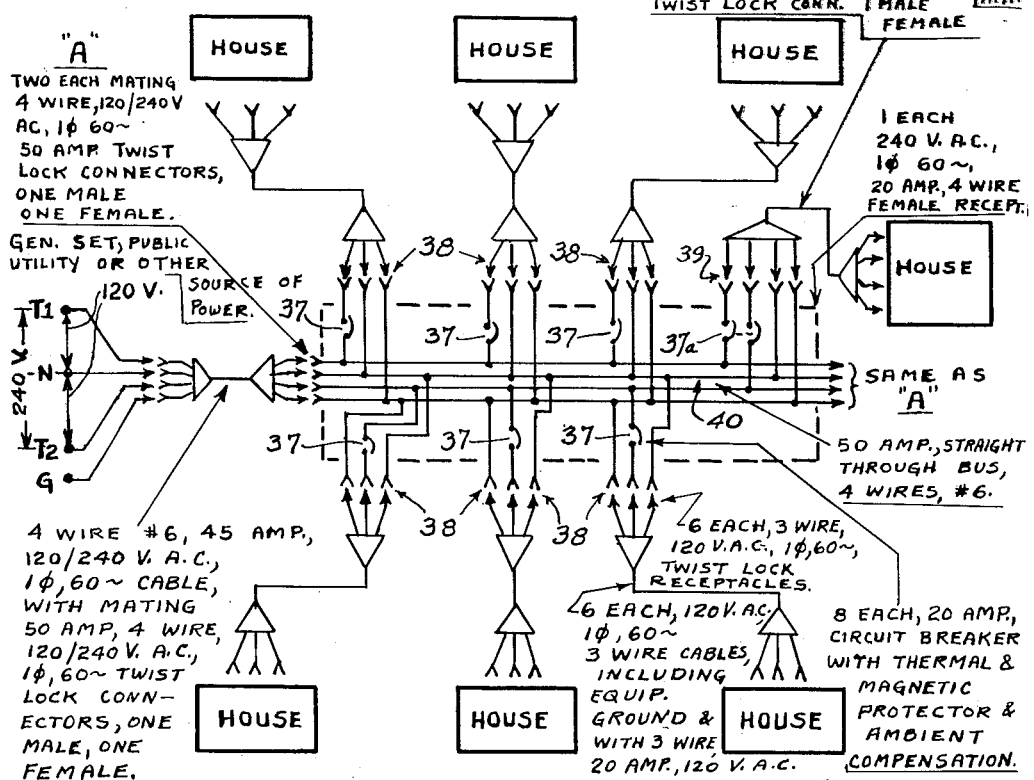
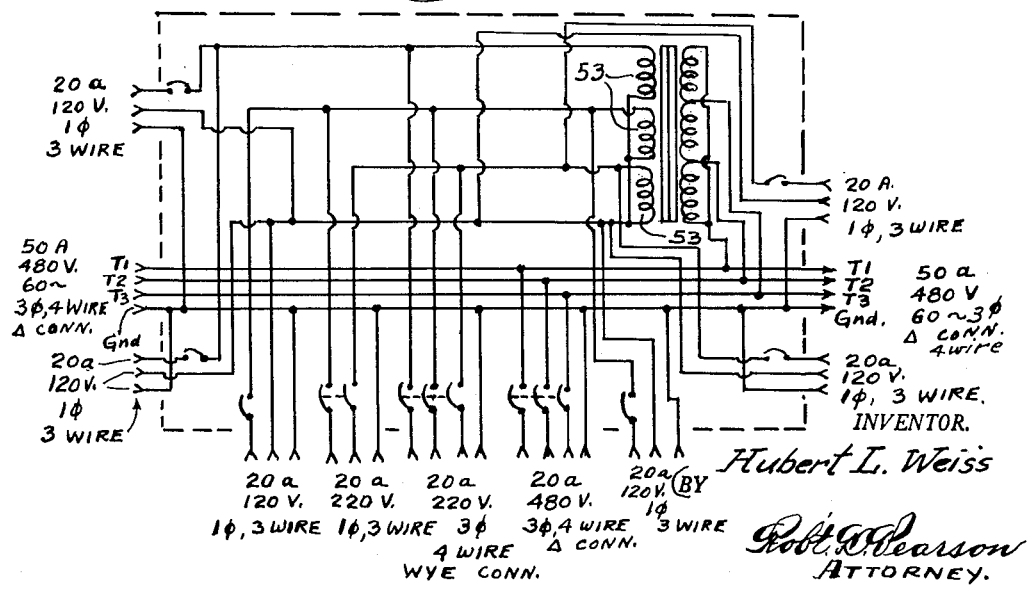

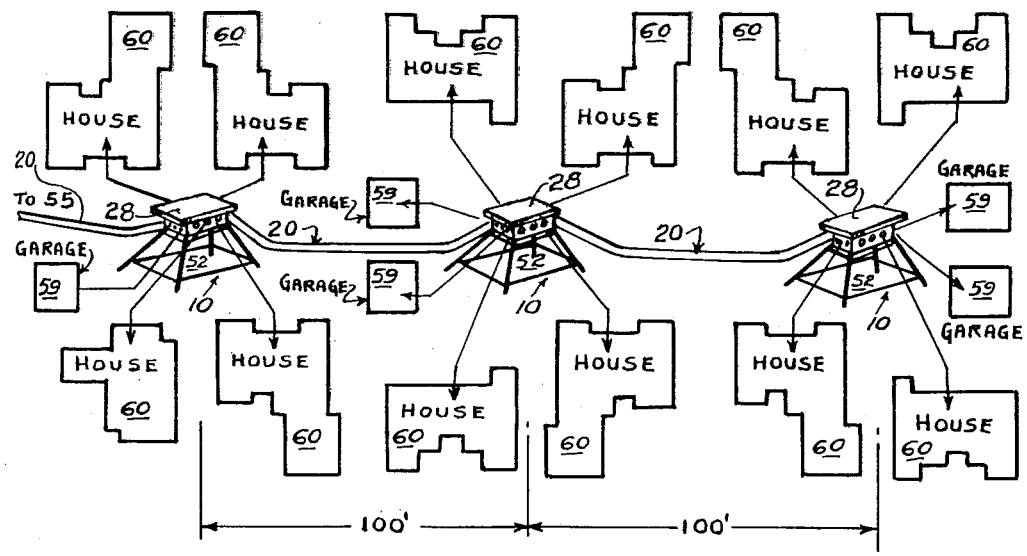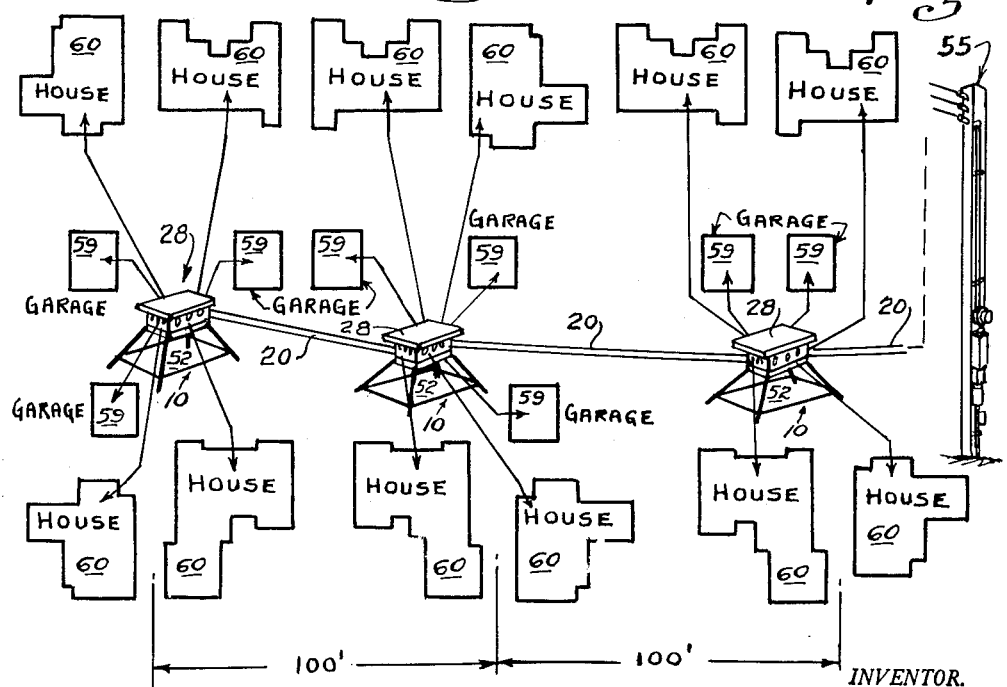

United States Patent Office 2,995,670
Patented Aug. 8, 1961

2,995,670
ELECTRIC POWER DISTRIBUTION SYSTEM
Hubert L. Weiss, % American Construction Equipment Co. Inc., 5055 W. Jefferson Blvd., Los Angeles, Calif.
Continuation of application Ser. No. 447,517, Aug. 3, 1954. This application June 16, 1959, Ser. No. 820,825
3 Claims. (Cl. 307—112)

The present invention relates to an electric power distribution system and includes portable electric distribution centers hereinafter referred to as portable centers, portable electric feeder cables, and may include step up as well as step down transformers and rectifiers. The system may be used in an aircraft manufacturing plant, at a military air base in lieu of ground power units, on a motion picture or television studio or lots, for a trade fair or exhibition, on a farm or in a circus, but is more particularly adapted to the building industry.

There has long been a need for a safe, temporary, portable and dependable system for the distribution of electric power, for example, 115/230 volt, A.C. single phase, 60 cycle, from either an independent generator set, or a public utility source, to all building trades, on construction projects operating within a series of paths, approximately 300 feet wide by 1400 feet long; and it is a primary object of this invention to fill this need.

Another object is to avoid the erection, replacement, dismantling and modification of temporary overhead power lines and temporary service poles; thereby eliminating costly labor and saving time, as this system is 100% reusable for subsequent installations without loss or modification.

A further object of this invention is to provide a practical system with a minimum voltage drop (well within legal limitations), and maximum safety protection, to user as well as equipment, together with ruggedness, flexibility, portability and ease of installation, and at as low a cost as is consistent with the other qualifications mentioned.

Another object of the invention is to provide upset proof stands for the portable centers used in this system; said portable centers having identification flags for readily locating the same, and also to prevent damage from trucks and autos due to the easily seen flags.

A further object is the provision of stands having strain relief rings coacting with mating clamp hooks on the cables so as to prevent connectors from being pulled off; and the stands from being tipped over.

An important object is to provide a weather proof system having portable centers which have all four sides inclined outward from the base to cause moisture to run outward from the receptacles and circuit breakers.

A further object is to furnish an overhanging canopy around all four sides from the portable centers for protection from weather and physical damage in its use, transit or storage.

Still another object is to be able to service the electric parts in the portable centers from two sides due to the removable top and bottom covers, and also to protect the circuit breakers by the use of a spring loaded cover.

This application is a continuation of my prior application Serial No. 447,517, filed August 3, 1954 and entitled, Electric Power Distribution System.

Other objects and advantages will become apparent in the following specification in which, FIG. 1 is a plan view, partly broken away to better show the invention.

FIG. 2 is a vertical sectional view, taken on line 2—2 of FIG. 1.

FIG. 3 is a sectional view taken on line 3—3 of FIG. 2.

FIG. 4 is a sectional view taken on line 4—4 of FIG. 2.

FIG. 5 is a perspective view of the portable center before assembly.

FIG. 6 is a schematic view showing the use of the invention on the job.

FIGS. 7, 8, 9, 10 and 11 are schematic views.

FIG. 12 is a conventional light pole.

Referring to the drawings (see FIGS. 1 and 2) the numeral 10 designates a stand, shown in the form of a truncated pyramid, comprising legs 12, converging upwardly from the ground to join a substantially horizontal, rectangular open frame 14. The leg braces 16 complete the stand which is preferably made of pipe welded together.

Two or more bottom braces 16 are provided with freely slidable rings 18 adapted to be connected to cables 20 by mating clamp hooks 21 for relieving strain on the cables 20 and preventing the connectors from being pulled off, or tipping the stand 10.

A rectangular base plate 24 is mounted on the frame 14, said plate having coextensive, downturned flanges 26, snugly fitting the frame. The portable center 28 (see FIGS. 2, 4 and 5) is open at the top and bottom except for inturned flanges 29 and 30, the flange 30 being provided with tapped holes 32 to register with apertures 33 in the plate 24 so that said plate 24 and portable center 28 may be detachably joined together by screws 34.

FIG. 5 shows an opening 35 in the portable center 28 which is closed (as shown in FIGS. 2 and 3) by a spring loaded cover plate 36, and which may be actuated by a tab 36a, said cover being adapted to protect the circuit breakers 37.

The portable center 28, for example, may contain six three-way twist lock receptacles 38, each rated 115 volts, 20 amperes; one four-way twist lock receptacle, rated 230 volts, 20 amperes, designated 39; an individual circuit breaker 37 for each of the six 115 volt receptacles, one two pole circuit breaker 37a for the single 220 volt receptacle, a neutral terminal strip 40, one male four-wire 50 ampere twist lock connector 41, and one female four-wire 50 ampere twist lock connector 42, and a straight through bus consisting of four number 6 conductors, as shown in schematic diagram in FIGS. 1 and 8, and a step down transformer 56 as shown in schematic diagram in FIG. 6.

Two or more portable centers may be connected alternately with feeder cables by means of the 50 ampere twist lock connectors, or the cable lengths 20 may be connected together without portable centers if desired. A D.C. rectifier 51, supported on rods 51a may be provided if desired (see FIG. 2). The transformers 53 are used to step down the voltage as shown in FIG. 9. The portable center member or box 28 is tapered outward on all sides from the base as shown at 43, to cause moisture to run out from the receptacles and circuit breakers.

Feeder cables may be 100 feet long, having four number 6 conductors encased in a neoprene jacket, and have a female 50 ampere twist lock connector on one end and a male 50 ampere twist lock connector on the other end, see FIGS. 10 and 11.

A top plate 44 is mounted on the portable center 28 and is aligned by downturned angles 45 adapted to fit snugly around the portable center, the top plate 44 extending outwardly to form a canopy 46, overhanging said portable center on all four sides and terminating in coextensive downturned flanges 47. The angles 45 are apertured for screws 47a for fastening to the portable center 28 (see FIGS. 2, 3 and 4). The top plate 44 protects the receptacles and circuit breakers from weather and physical damage in use and storage, and also may be used as a table. The plate 44 is provided in one corner 44a with a downturned closed end socket 48 to receive a standard 49, usually about four feet long and having a flag 50 secured to its top (see FIGS. 1, 2 and 4). The flag 50 is for identification in locating the portable centers 28 on the job, and to warn truck drivers of its presence. Equipment ground connectors are provided in each receptacle, and in each cable.

By inspecting FIG. 5 it will be seen that the portable box structure 28, which is detachably supportable in an elevated position by the means which has already been described, has in one of its vertical side walls the admission opening 35 and has a plurality of apertures 28 in its remaining three vertical walls, in which apertures are mounted the already mentioned electric current conducting and current control means.

FIGS. 6, 7, 8, 10 and 11 show pictorially, diagrammatically and schematically typical field jobs wherein the stand 10, the portable center 28, feeder cable 20 and step down transformer 56 are utilized in the distribution of electrical power, to points 52 adjacent to the buildings 60 and garages 59 being constructed, from 110/220 v. A.C., single phase public utility pole, or a generator set 55; or from a 480 v. A.C., three phase public utility pole, or generator set 57.

A public utility pole 55 (see FIG. 12), or generator set or other power source, is connected to the feeder cables 20 which in turn are alternately connected to the portable centers 28, which in turn may be spaced 100 feet apart, and which may be placed along an alley of a block which may be 1400 feet long; thus all trades which may be constructing houses in this block will be adequately supplied with electric power.

A minimum storage space is required when the stands 10 and portable centers 28 are not in use, as the stands telescope one over the other when stacked vertically, and as the portable centers have flat tops and bottoms for vertical stacking.

Said terminal boxes 28 are detachably secured to the standards 10, as shown, no bolts, clamps or special fixtures being necessary.

The inventor claims:

1. For use with power extension cords having one male and one female connector at opposite ends to provide a temporary power system: a portable base; a box having outer walls; means mounting the box on the base; a female connector element mounted on an outer wall of the box for exterior access thereto, said female connector element being cooperable with a male connector of one of said power extension cords; a male connector element also mounted on an outer wall of the box in spaced relationship to said female connector element for exterior access and connection thereto, said male connector element being cooperable with a female connector element of another power extension cord; through bus means within the box permanently joining in electrical circuit relationship the male and female connector elements whereby the box may be selectively inserted between otherwise directly connected power extension cords; a series of service socket members physically different from the said female connector element such that an electrical element that fits any of said series of service socket members does not fit said female connector element; means mounting the service socket members on an outer wall of said box for exterior access and connection thereto; a plurality of overload protection devices carried by the box; and means within the box electrically tapping the service socket members to the bus means through said overload protection devices; each of said overload protection devices limiting the current in the corresponding tapping means to a fraction of the current carrying capacity of said through bus means.

2. The combination as set forth in claim 1 in which the overload protection devices are also mounted at an outer wall of said box for exterior access thereto.

3. For use in a system of temporary electrical distribution: a plurality of electrical power takeoff boxes, each box having outer walls; each box having a socket connector element secured at an outer wall of the box and accessible exteriorly of the box for reception of prongs of a companion connector element, and a prong connection element secured at an outer wall of the box and accessible exteriorly of the box for projection into the socket of a companion connector element; each box having through bus means therein electrically joining in electrical circuit relationship the corresponding socket connector element and the prong connector element; a plurality of extension means for serial connection of the prong connector element of one box to the socket connector element of the next box while the consecutive boxes are remotely spaced; each box having a plurality of overload protected takeoff sockets secured on an outer wall thereof that are each physically different from the corresponding socket connector element such that an electrical element that fits any of said service sockets does not fit said socket connector element; and means within each box electrically connecting the corresponding overload protected takeoff sockets to the corresponding through bus means; each of the service sockets being limited in current carrying capacity to a fraction of the current rating of the through bus means.

References Cited in the file of this patent

UNITED STATES PATENTS

| | | |
|---|---|---|
| 1,603,940 | Eaglen | Oct. 19, 1926 |
| 2,733,314 | Schmidt | Jan. 31, 1956 |